(12) United States Patent
Noy et al.

(10) Patent No.: US 8,625,129 B2
(45) Date of Patent: Jan. 7, 2014

(54) METHOD OF SEPERATING MULTIPLE PRINT JOBS

(75) Inventors: Amir Noy, Rishion Lezion (IL); Ilan Shimony, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 12/515,128

(22) PCT Filed: Nov. 7, 2007

(86) PCT No.: PCT/EP2007/062011
§ 371 (c)(1),
(2), (4) Date: Jan. 15, 2010

(87) PCT Pub. No.: WO2008/058879
PCT Pub. Date: May 22, 2008

(65) Prior Publication Data
US 2010/0141985 A1   Jun. 10, 2010

(30) Foreign Application Priority Data
Nov. 18, 2006   (GB) .................................. 0623063.5

(51) Int. Cl.
*G06F 3/12*   (2006.01)
*G06K 15/00*   (2006.01)

(52) U.S. Cl.
USPC ......................................... 358/1.15; 358/1.18

(58) Field of Classification Search
USPC ........ 358/1.1, 1.8, 1.9, 1.12, 1.13, 1.14, 1.15, 358/1.17, 1.18, 3.28
See application file for complete search history.

(56) References Cited

U.S. PATENT DOCUMENTS

| | | | |
|---|---|---|---|
| 4,757,348 A * | 7/1988 | Rourke et al. ................... 399/84 |
| 5,366,307 A * | 11/1994 | McGourty et al. ............ 400/708 |
| 6,227,531 B1 | 5/2001 | Guerrero et al. |
| 7,529,496 B2 * | 5/2009 | Dan ................................ 399/82 |
| 2003/0020957 A1 | 1/2003 | Brewster |
| 2008/0053327 A1 * | 3/2008 | Weilacher ..................... 101/484 |

FOREIGN PATENT DOCUMENTS

| EP | 1246051 | 10/2002 |
|---|---|---|
| EP | 1463000 A | 9/2004 |

* cited by examiner

*Primary Examiner* — Gabriel Garcia
(74) *Attorney, Agent, or Firm* — Vazken Alexanian

(57) ABSTRACT

A method for separating multiple print jobs sent by one or more computers to a document printer, the method including printing a first banner at the edge of a top sheet of a first print job, and printing a second banner at the edge of a top sheet of a second print job.

5 Claims, 4 Drawing Sheets

METHOD OF SEPERATING MULTIPLE PRINT JOBS

FIELD OF THE INVENTION

The present invention relates to data processing and printing in general, and in particular to separating print jobs on document printers.

BACKGROUND OF THE INVENTION

In many computing environments document printers, to which computer users send print jobs, insert a separator page between consecutive print jobs in order to allow one print job to be distinguished from the next. When multiple print jobs collect in a stack in the printer output tray, a particular print job may be located and retrieved by flipping through the stack until a separator page is found that identifies the print job. Aside from being easy to miss, the separator pages themselves are typically of no use once the print jobs have been separated and removed from the printer output tray.

SUMMARY OF EMBODIMENTS OF THE INVENTION

The present invention in embodiments thereof discloses systems and methods for separating print jobs that do not require the use of separator pages.

In one aspect of the present invention a method is provided for separating multiple print jobs sent by one or more computers to a document printer, the method including printing a first banner at an edge of a top sheet of a first print job, and printing a second banner at an edge of a top sheet of a second print job.

In another aspect of the present invention the printing of the banners includes printing where the banners are visually discernable when a stack of the print jobs is viewed on edge.

In another aspect of the present invention the printing of the banners includes printing where the banners span the length of the edges.

In another aspect of the present invention the printing of the banners includes printing using different colors to represent different print job categories.

In another aspect of the present invention a method is provided for separating multiple print jobs sent by one or more computers to a document printer, the method including printing a first banner at an edge of each sheet of a first print job where the location of the first banner along the edge of each of the sheets in the first print job is the same, and printing a second banner at an edge of each sheet of a second print job where the location of the second banner along the edge of each of the sheets in the second print job is the same, and where the location of the banners along the edges of the sheets differs from the first print job to the second print job.

In another aspect of the present invention the printing of the banners includes printing where the banners do not extend the entire length of the edges.

In another aspect of the present invention the printing of the banners includes printing where the print jobs are individually visually discernable when a stack of the print jobs is viewed on edge.

In another aspect of the present invention the printing of the banners includes printing using different colors to represent different print job categories.

In another aspect of the present invention a method is provided for separating multiple copies of a document within a print job sent by a computer to a document printer, the method including printing a first banner at an edge of each sheet of a print job, where the location of the first banner along the edge of each of the sheets in the print job is the same, and printing a second banner at an edge of each sheet of the print job, where the location of the first and second banners differ, and where the location of the second banner along the edge of each sheet is the same within a copy of a document of the print job, but differs for each of a plurality of copies of the document within the print job.

In another aspect of the present invention the printing of the banners includes printing where the copies are individually visually discernable when the print job is viewed on edge.

In another aspect of the present invention the printing of the banners includes printing using different colors to represent different print job categories.

In another aspect of the present invention a system is provided for separating multiple print jobs sent by one or more computers to a document printer, the system including a computer, and a printer, where the computer and the printer are configured where the computer controls the printer to print a first banner at an edge of a top sheet of a first print job, and print a second banner at an edge of a top sheet of a second print job.

In another aspect of the present invention the banners are visually discernable when a stack of the print jobs is viewed on edge.

In another aspect of the present invention the banners span the length of the edges.

In another aspect of the present invention the banners are composed from different colors to represent different print job categories.

In another aspect of the present invention a system is provided for separating multiple print jobs sent by one or more computers to a document printer, the system including a computer, and a printer, where the computer and the printer are configured where the computer controls the printer to print a first banner at an edge of each sheet of a first print job where the location of the first banner along the edge of each of the sheets in the first print job is the same, and print a second banner at an edge of each sheet of a second print job where the location of the second banner along the edge of each of the sheets in the second print job is the same, and where the location of the banners along the edges of the sheets differs from the first print job to the second print job.

In another aspect of the present invention the banners do not extend the entire length of the edges.

In another aspect of the present invention the print jobs are individually visually discernable when a stack of the print jobs is viewed on edge.

In another aspect of the present invention the banners are composed from different colors to represent different print job categories.

BRIEF DESCRIPTION OF THE DRAWINGS

Embodiments of the present invention will be understood and appreciated more fully from the following detailed description taken in conjunction with the appended drawings in which.

DETAILED DESCRIPTION OF EMBODIMENTS OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1A:
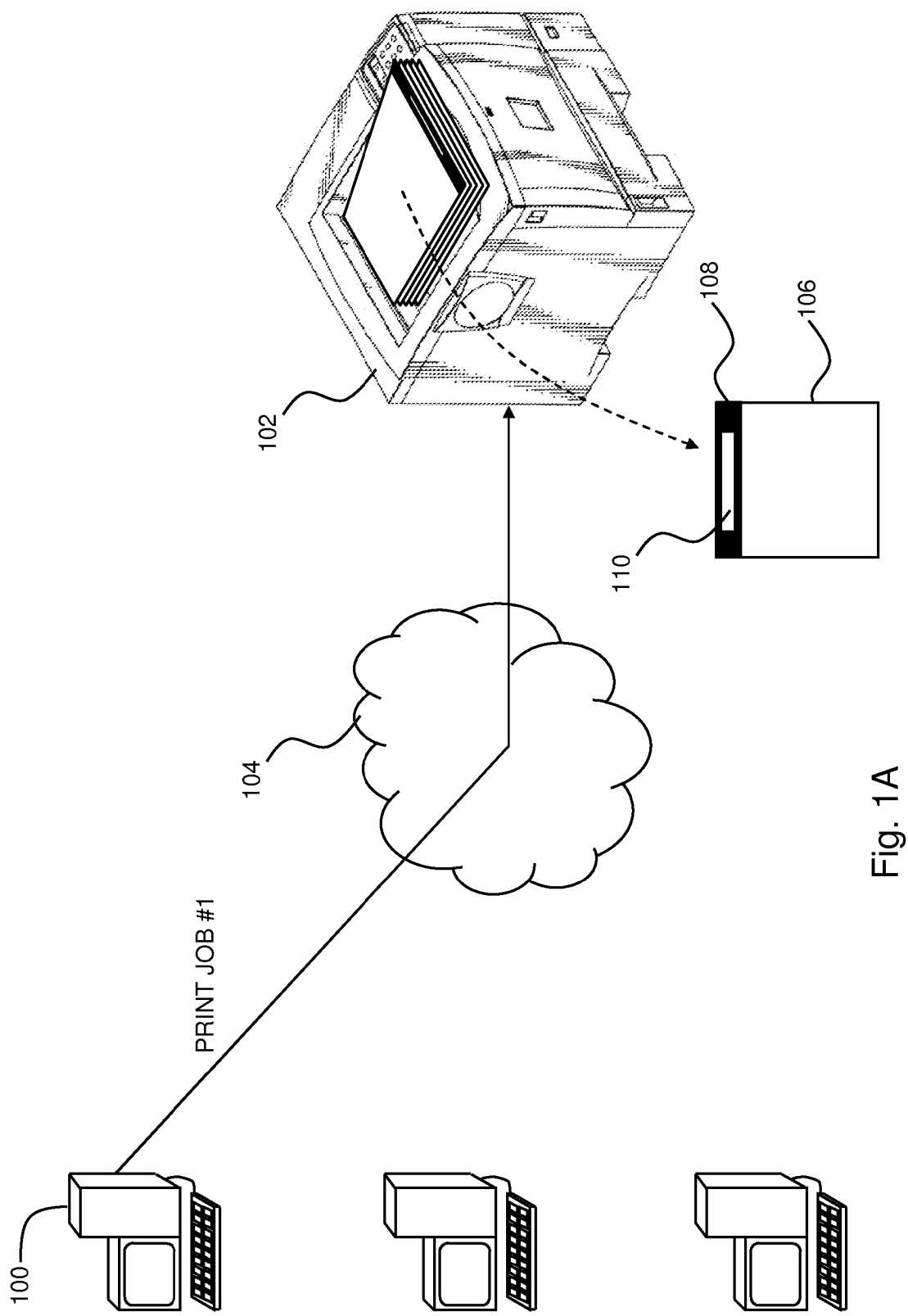
FIGS. 1A and 1B are simplified conceptual illustrations of a system for separating print jobs, constructed and operative in accordance with an embodiment of the present invention.
Figure 1B:
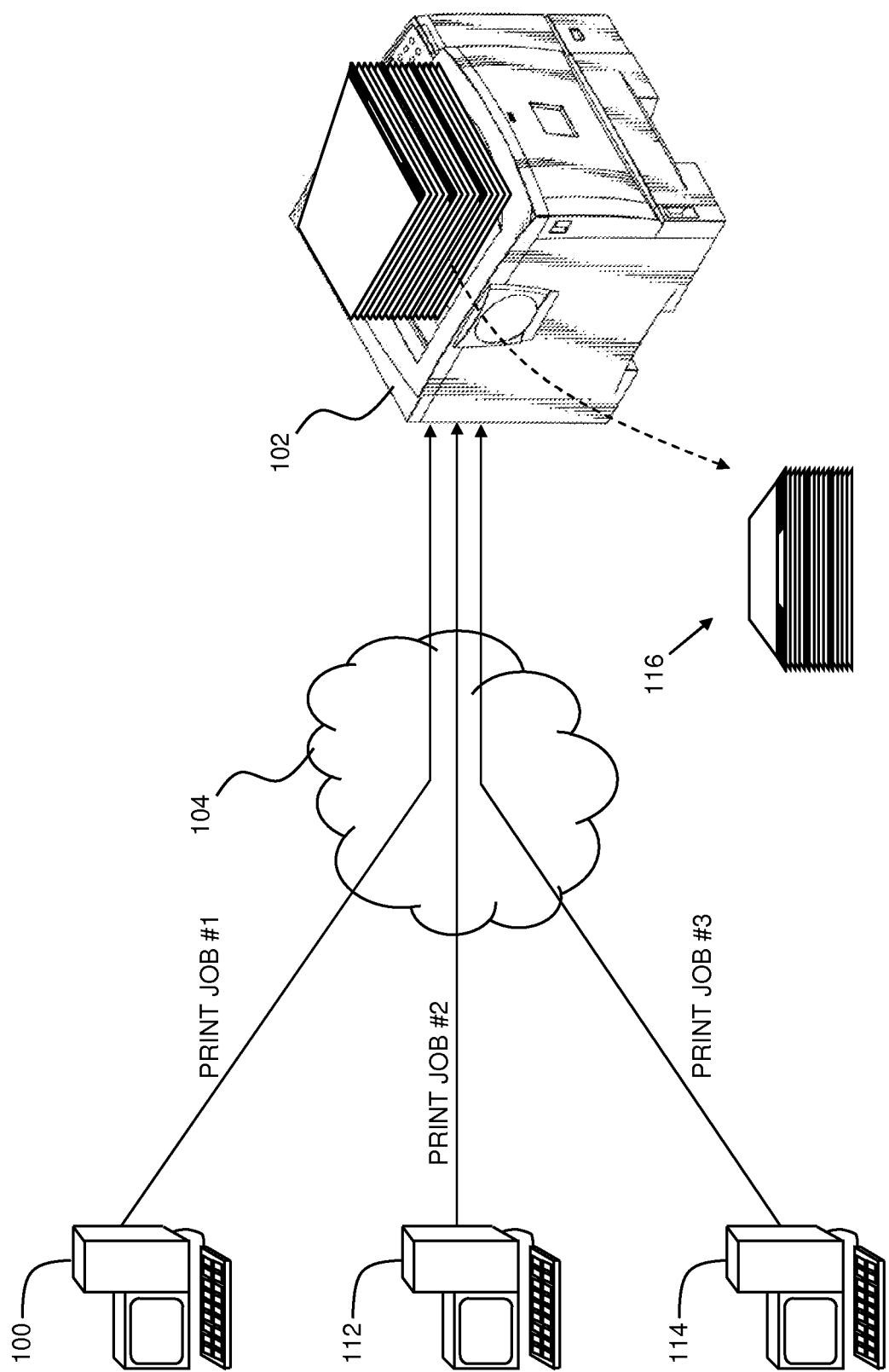

Reference is now made to FIGS. 1A and 1B, which are simplified conceptual illustrations of a system for separating print jobs, constructed and operative in accordance with an embodiment of the present invention. In FIG. 1A a print job request, identified for illustration purposes as "Print Job #1", is sent from a computer 100 to a document printer 102 via a communications medium 104, such as a computer network. Printer 102 then prints the job, the top sheet of which is alternatively shown at reference numeral 106. Printer 102 prints a banner 108 on top sheet 106 such that banner 108 reaches one or more edges of top sheet 106, such as the top or side edges. Banner 108 may span the length of an edge of top sheet 106, and/or may be printed in black or any other color or color combination. Banner 108 may incorporate a display area 110 in which printer 102 may print matter such as information identifying the print job, the requestor, or any other information, including information that is normally printed on a separator page.

In FIG. 1B two additional print job requests, identified for illustration purposes as "Print Job #2" and "Print Job #3", are sent from a computer 112 and a computer 114 respectively to printer 102. Printer 102 then prints the jobs, printing banner 108 on the top sheet of each print job as described above. The stacked output of Print Jobs #1, #2, and #3 is alternatively shown at reference numeral 116. When stack 116 is viewed on edge, sheets having banners 108 may be clearly discerned, in which case each print job may be easily found without flipping through each page in the stack.

Printer 102 is capable of borderless printing, and may allow a page-bleed offset to be specified to allow printing to the edge of the paper. A raster graphic with matter to be printed in display area 110 may be sent with the data to be printed. Printer 102 may thus bleed-print banner 108 at the edge of each top sheet 106.

Figure 2A:
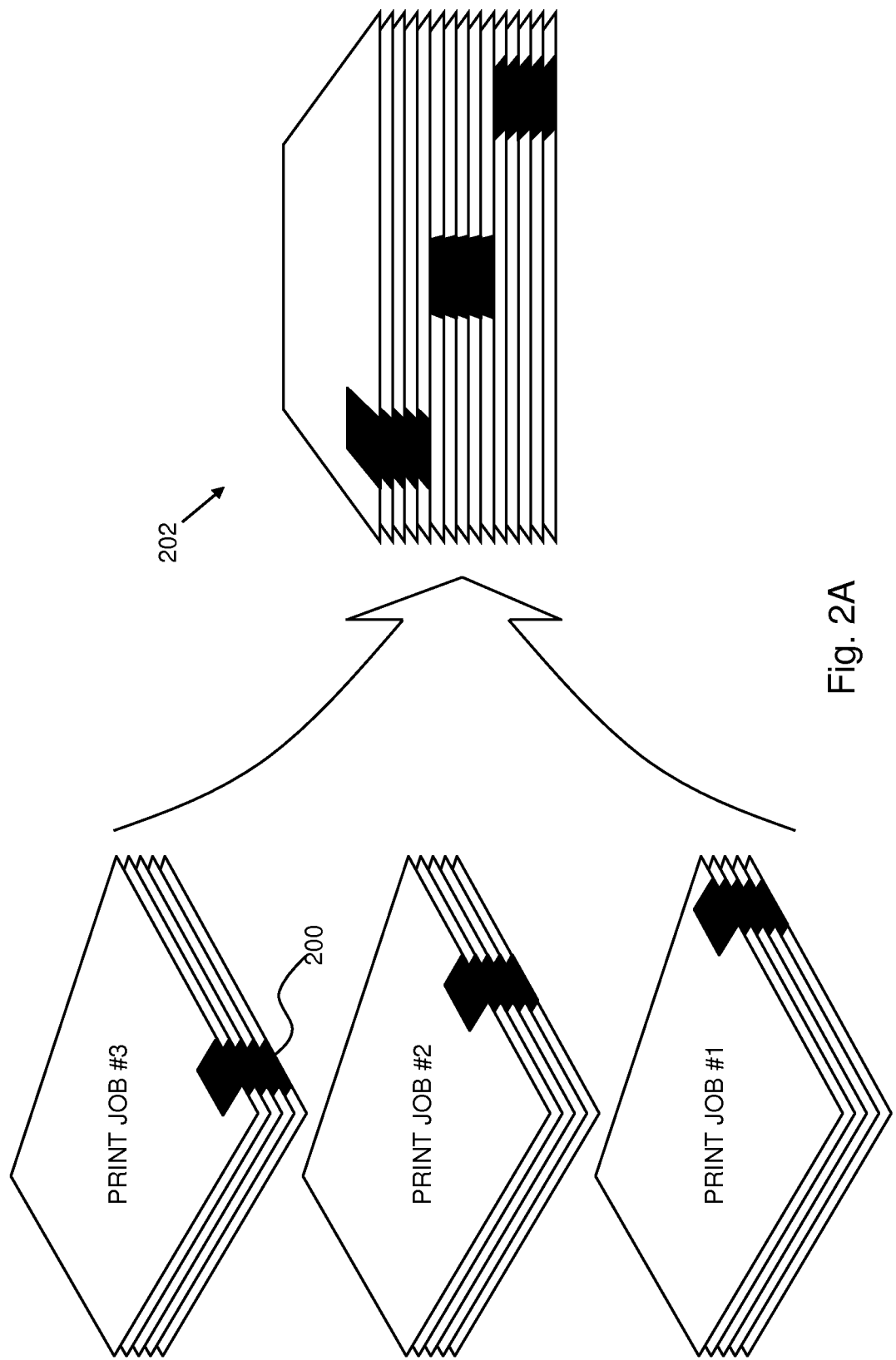
FIGS. 2A and 2B are simplified conceptual illustrations of alternate print job separation protocols for use with the system of FIGS. 1A and 1B, operative in accordance with an embodiment of the present invention.

Reference is now made to FIGS. 2A, which is a simplified conceptual illustration of an alternate print job separation protocol for use with the system of FIGS. 1A and 1B, operative in accordance with an embodiment of the present invention. In FIG. 2A, instead of printing a banner only on the top sheet of each print job, printer 102 (FIG. 1A) prints a banner 200 at the edge of each sheet in a print job such that the location of banner 200 along the edge of each sheet is the same within a print job, but differs from print job to print job. Banner 200 does not extend the entire length of an edge that it reaches, but is sufficiently dimensioned such that each print job in a stack 202 of multiple print jobs may be individually discerned when stack 202 is viewed on edge.

Figure 2B:
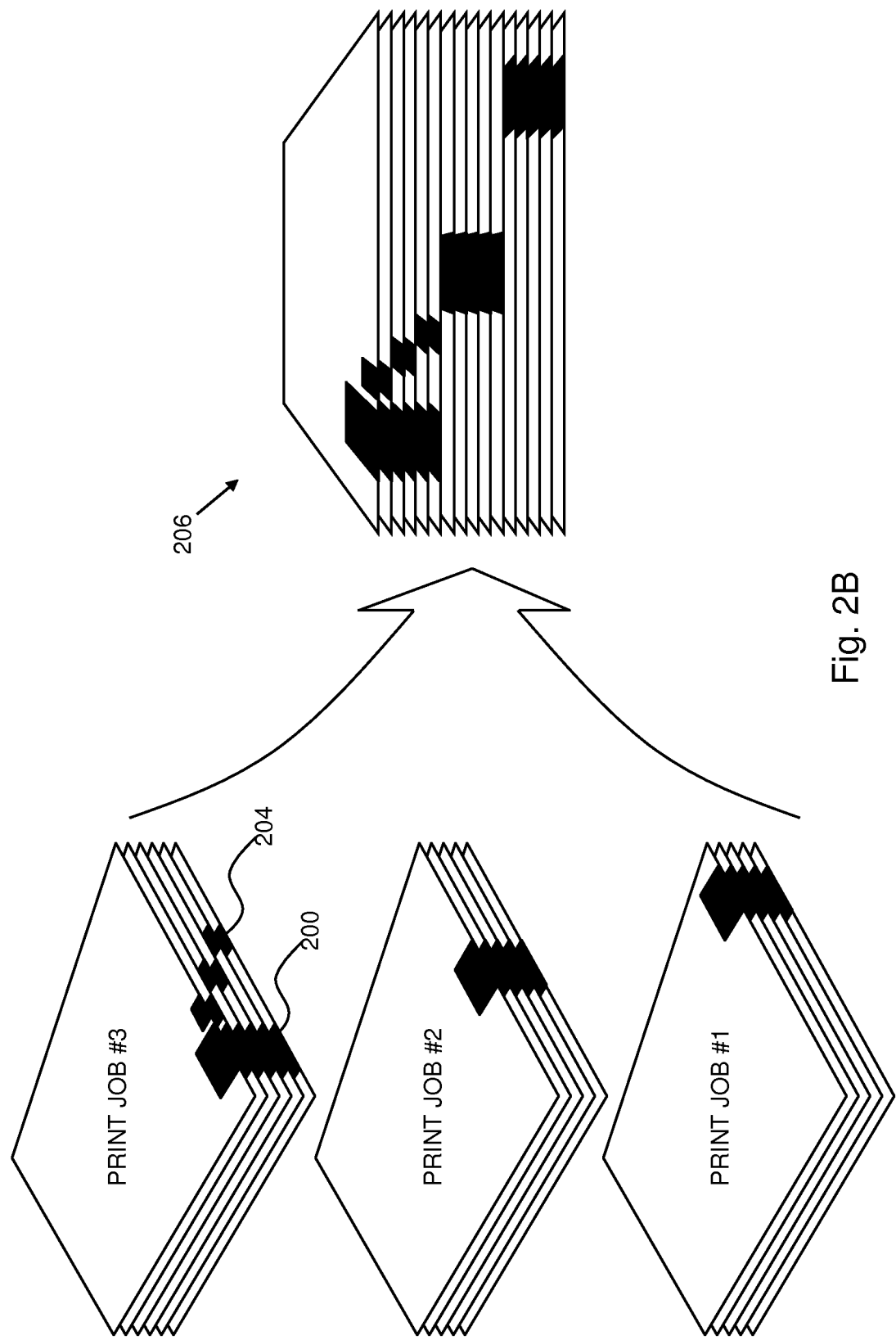

Reference is now made to FIG. 2B, which is a simplified conceptual illustration of an alternate print job separation protocol for use with the system of FIGS. 1A and 1B, operative in accordance with an embodiment of the present invention. The protocol of FIG. 2B is substantially similar to that of FIG. 2A with the notable exception that multiple copies of the same document within a single print job may be printed with a banner 204 that is in addition to and spaced apart from banner 200 and that acts as a copy separator. Banner 204 is printed at an edge of each sheet of each copy within a print job such that the location of banner 204 along the edge of each sheet is the same within a copy, but differs from copy to copy within the print job. Thus, each copy within a print job in a stack 206 of multiple print jobs, one or more of which has multiple copies of the same document, may be individually discerned when stack 206 is viewed on edge.

It is appreciated that the invention, including any of the embodiments described hereinabove, may be adapted for separating and categorizing printouts by user, priority, security level, department, or any other criteria, such as by using banners of different colors to indicate each category.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

The invention claimed is:

1. A method for separating multiple print jobs sent by one or more computers to a document printer, the method comprising:
    printing a first banner spanning the entire length of a top or bottom edge of a top sheet of a first print job; and
    printing a second banner spanning the entire length of a top or bottom edge of a top sheet of a second print job;
    wherein each copy within the print job that has multiple copies of the same document is individually discerned when viewed on edge;
    wherein the printing of the banners comprises printing in a location such that the banners are visually discernable when a stack of said print jobs is viewed on edge; and
    wherein the banners comprise a display area containing print job information.

2. A method according to claim 1, further comprising:
    printing a first banner at an edge of each sheet of the first print job wherein the location of said first banner along said edge of each of said sheets in said first print job is the same; and
    printing a second banner at an edge of each sheet of the second print job wherein the location of said second banner along said edge of each of said sheets in said second print job is the same, and
    wherein the location of said banners along said edges of said sheets differs from said first print job to said second print job.

3. A system for separating multiple print jobs sent by one or more computers to a document printer, the system comprising:
    a computer; and
    a printer,
    wherein said computer is configured to control the printer to:
    print a first banner spanning the entire length of an a top or bottom edge of a top sheet of a first print job, and
    print a second banner spanning the entire length of an a top or bottom edge of a top sheet of a second print job;
    wherein each copy within the print job that has multiple copies of the same document is individually discerned when viewed on edge;

wherein said banners are visually discernable when a stack of said print jobs is viewed on edge; and wherein the banners comprise a display area containing print job information.

4. A system according to claim 3 wherein said computer controls said printer to:

print a first banner at an edge of each sheet of the first print job wherein the location of said first banner along said edge of each of said sheets in said first print job is the same; and print a second banner at an edge of each sheet of the second print job wherein the location of said second banner along said edge of each of said sheets in said second print job is the same, and wherein the location of said banners along said edges of said sheets differs from said first print job to said second print job.

5. A system according to claim 4 wherein said banners do not extend the entire length of said edges.

* * * * *